(12) United States Patent
Kritzer et al.

(10) Patent No.: US 11,016,650 B1
(45) Date of Patent: May 25, 2021

(54) BUILDING DATA METRIC OBJECTS THROUGH USER INTERACTIONS WITH DATA MARKS OF DISPLAYED VISUAL REPRESENTATIONS OF DATA SOURCES

(71) Applicant: Tableau Software, Inc., Seattle, WA (US)

(72) Inventors: Andrew Herbert Kritzer, San Carlos, CA (US); Evan Michael McLain, Seattle, WA (US); David Robert Potter, Bothell, WA (US); Hermann Faith Chong, Redmond, WA (US); Caleb Michael Predmore, Woodinville, WA (US); Keith Ryan Jones, Redmond, WA (US); Zachary Page Woodall, Seattle, WA (US); Zhe Zhang, Redmond, WA (US)

(73) Assignee: Tableau Software, Inc., Seattle, WA (US)

( * ) Notice: Subject to any disclaimer, the term of this patent is extended or adjusted under 35 U.S.C. 154(b) by 0 days.

(21) Appl. No.: 16/578,180

(22) Filed: Sep. 20, 2019

(51) Int. Cl.
*G06F 3/0484* (2013.01)
*G06F 3/0482* (2013.01)
*G06F 16/25* (2019.01)
*G06F 16/26* (2019.01)

(52) U.S. Cl.
CPC ........ *G06F 3/04847* (2013.01); *G06F 3/0482* (2013.01); *G06F 16/254* (2019.01); *G06F 16/26* (2019.01); *G06F 2203/04803* (2013.01)

(58) Field of Classification Search
CPC .... G06F 3/04847; G06F 3/0482; G06F 16/26; G06F 16/254; G06F 2203/04803
See application file for complete search history.

(56) References Cited

U.S. PATENT DOCUMENTS

| | | | |
|---|---|---|---|
| 6,750,864 B1* | 6/2004 | Anwar | G06T 11/206 345/440 |
| 7,130,812 B1* | 10/2006 | Iyer | G06Q 10/063 705/7.11 |
| 2005/0091640 A1* | 4/2005 | McCollum | G06N 5/025 717/117 |
| 2010/0313157 A1* | 12/2010 | Carlsson | G06F 16/288 715/769 |

(Continued)

*Primary Examiner* — Nicholas Klicos
(74) *Attorney, Agent, or Firm* — Morgan, Lewis & Bockius LLP

(57) ABSTRACT

A method visualizes data sources. A user selects a data source, and the computer system displays a first data visualization according to placement of data fields in shelves of the user interface. The data visualization comprises visual data marks representing the data source. A user selects some of the data marks. In response, the system displays a metric window including a data metric object preview, a summary of the selected data marks, and setting controls. The user provides input to create the data metric object. In response, the system creates the data metric object, including: configuration parameters derived from the first data visualization; an initial extract from the data source according to the configuration parameters; and a schedule for recurring retrieval of data from the data source to update the extract. The system then displays a second data visualization according to the configuration parameters and the extract.

20 Claims, 13 Drawing Sheets

(56) References Cited

U.S. PATENT DOCUMENTS

| | | | |
|---|---|---|---|
| 2011/0225525 A1* | 9/2011 | Chasman | G06T 11/206 715/763 |
| 2012/0272186 A1* | 10/2012 | Kraut | G06F 3/0482 715/810 |
| 2013/0232452 A1* | 9/2013 | Krajec | G06F 3/0482 715/840 |
| 2013/0289774 A1* | 10/2013 | Day | G05B 15/02 700/276 |
| 2014/0040182 A1* | 2/2014 | Gilder | G06Q 40/12 707/602 |
| 2014/0157142 A1* | 6/2014 | Heinrich | G06F 3/048 715/744 |
| 2014/0172654 A1* | 6/2014 | Wagner | G06Q 40/12 705/30 |
| 2014/0207802 A1* | 7/2014 | Raghavan | G06F 16/9024 707/749 |
| 2015/0040052 A1* | 2/2015 | Noel | G06Q 10/063 715/771 |
| 2015/0261737 A1* | 9/2015 | Devarajan | G06F 16/9024 715/215 |
| 2015/0356064 A1* | 12/2015 | Mizuno | G06T 11/206 715/780 |
| 2016/0103871 A1* | 4/2016 | Zheng | G06F 16/289 707/766 |
| 2016/0231900 A1* | 8/2016 | Meaney | G06F 9/451 |
| 2016/0246863 A1* | 8/2016 | Sexton | G06K 9/6218 |
| 2016/0350389 A1* | 12/2016 | Kloke | G06F 16/9024 |
| 2016/0378843 A1* | 12/2016 | Cherwonka | G06F 16/248 707/602 |
| 2017/0024651 A1* | 1/2017 | Mishra | G06N 5/04 |
| 2017/0091246 A1* | 3/2017 | Risvik | G06F 16/9024 |
| 2017/0102866 A1* | 4/2017 | Calvillo | G06F 16/958 |
| 2018/0032216 A1* | 2/2018 | Naous | G06Q 10/0639 |
| 2018/0253218 A1* | 9/2018 | Levesque | G06F 16/125 |

* cited by examiner

BUILDING DATA METRIC OBJECTS THROUGH USER INTERACTIONS WITH DATA MARKS OF DISPLAYED VISUAL REPRESENTATIONS OF DATA SOURCES

TECHNICAL FIELD

The disclosed implementations relate generally to data visualization and more specifically to systems, methods, and user interfaces that enable users to interact with data visualizations to analyze data.

BACKGROUND

Data visualization applications enable a user to understand a data set visually, including distribution, trends, outliers, and other factors that are important to making business decisions. Some data sets are very large or complex, and include many data fields. Various tools can be used to help understand and analyze the data, including dashboards that have multiple data visualizations. However, some functionality may be difficult to use or hard to find within a complex user interface with such large or complex data sets.

SUMMARY

Accordingly, implementations of the present invention are directed to data visualization user interfaces that allow users to create summary metrics through user interaction with data marks of existing data visualizations.

In accordance with some implementations, a method of visualizing data sources is performed at a computer having a display, one or more processors, and memory storing one or more programs configured for execution by the one or more processors. The method includes receiving user selection of a data source, then displaying a first data visualization in a data visualization user interface according to placement of data fields, from the data source, in shelves of the user interface. Generating data visualizations according to user placement of data fields in user interface shelves is described in U.S. patent application Ser. No. 16/220,240, filed Dec. 14, 2018, entitled "Systems and Methods of Generating Data Marks in Data Visualizations," which is incorporated by reference in its entirety.

The data visualization comprises a plurality of visual data marks representing data from the data source. The method includes detecting a first user input to select a subset of the visual data marks. In response to detecting the first user input, the method displays a metric window. The metric window includes a data metric object preview, a summary of the selected subset of visual data marks, and one or more setting controls. The method further includes detecting, in the metric creation window, a second user input to create the data metric object. In response to detecting the second user input, the method creates the data metric object. The data metric object includes a set of configuration parameters derived from the first data visualization, an initial extract from the data source according to the set of configuration parameters, and a schedule for recurring retrieval of data from the data source to update the extract. The method includes instantiating the data metric object, including displaying a second data visualization according to the set of configuration parameters and the extract.

In some implementations, when the system detects the first user input, the system visually highlights the selected subset of the visual data marks.

In some implementations, the metric creation window is displayed as a side panel or a popup window.

In some implementations, the one or more setting controls include controls to specify security permissions and/or to specify a retention period. In some implementations, the controls to specify the retention period include settings for length of retention, timeline detail level, and span of data accessed at generation time. In some instances, while displaying the metric creation window, the system receives user input directed to the setting controls to modify the retention period. In response to detecting the user interaction with the setting controls, the system updates the display of the metric object preview.

In some implementations, displaying the second data visualization is in response to detecting the second user input, and displaying the second data visualization includes displaying (i) information about current and subsequent refresh events and (ii) a number summarizing data in the second data visualization.

In some implementations, the system provides user interface controls to schedule recurring retrieval of data from the data source to update the extract.

In some implementations, the second data visualization is a bar chart, a line graph, a scatterplot, a map, or a heatmap.

In accordance with some implementations, a computer system for visualizing data sources includes a display, one or more processors, and memory storing one or more programs. The one or more programs include instructions for performing any of the methods described herein.

In accordance with some implementations, a non-transitory computer-readable storage medium stores one or more programs configured for execution by one or more processors of a computer system. The one or more programs include instructions that when executed by the one or more processors cause the computer system to perform any of the methods described herein.

Thus, methods, systems, and graphical user interfaces are disclosed that enable users to easily interact with data visualizations.

Both the foregoing general description and the following detailed description are exemplary and explanatory, and are intended to provide further explanation of the invention as claimed.

BRIEF DESCRIPTION OF THE DRAWINGS

For a better understanding of the aforementioned systems, methods, and graphical user interfaces, as well as additional systems, methods, and graphical user interfaces that provide data visualization analytics, reference should be made to the Detailed Description of Implementations below, in conjunction with the following drawings in which like reference numerals refer to corresponding parts throughout the figures.

Reference will now be made to implementations, examples of which are illustrated in the accompanying drawings. In the following description, numerous specific details are set forth in order to provide a thorough understanding of the present invention. However, it will be apparent to one of ordinary skill in the art that the present invention may be practiced without requiring these specific details.

DETAILED DESCRIPTION OF IMPLEMENTATIONS

Figure 7:
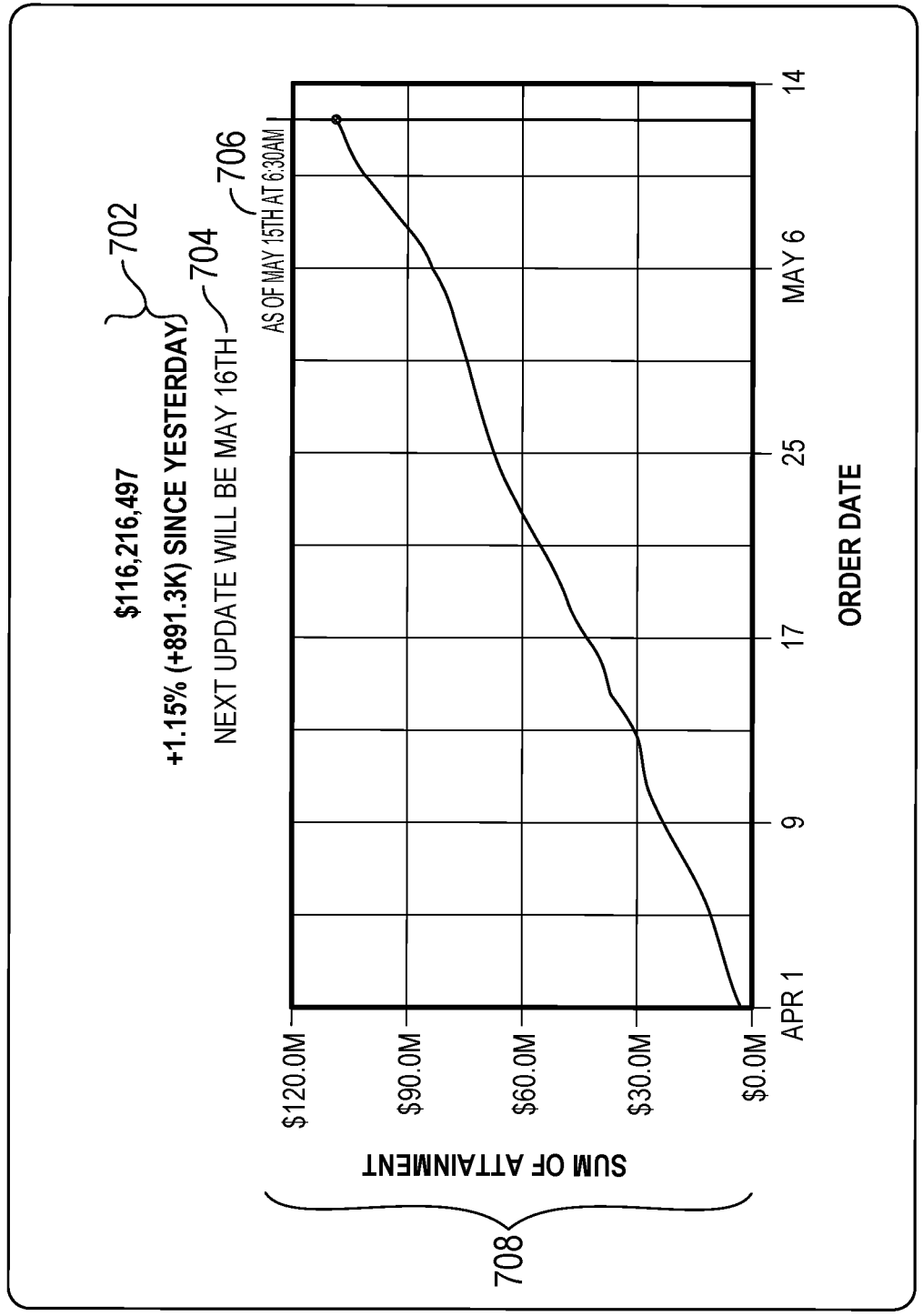
FIG. 7 illustrates a visual rendering for a data metric object, according to some implementations.

FIGS. 1A-1D illustrate a workflow 100 that allows a user to create data metric objects through user interaction with a subset of data marks of an existing data visualization. The workflow 100 begins with a user interacting with a graphical user interface 400 displaying a data visualization 402. The data visualization 402 includes data marks (e.g., the lines in the line graph 402) representing data from a selected data source. The user selects one or more of the data marks, as illustrated by the pointer icon 410. The updated user interface 500 shows the same data visualization 402, but now emphasizes the selected data mark 504. After the user creates a data metric object corresponding to the selected mark 504, a second data visualization 700 is displayed on the user's device 200-1 according to the generated data metric object. Data metric objects are created in order to provide quick updates as the underlying data changes over time. In many cases, viewing the updates occurs on a mobile device 200-2, which can display a smaller rendering of the second data visualization 700. As shown in FIG. 7, the second data visualization includes a graphic, a number that summarizes the data in the graphic, and some additional information about the extract that was used to generate the second data visualization.

Figure 1A:
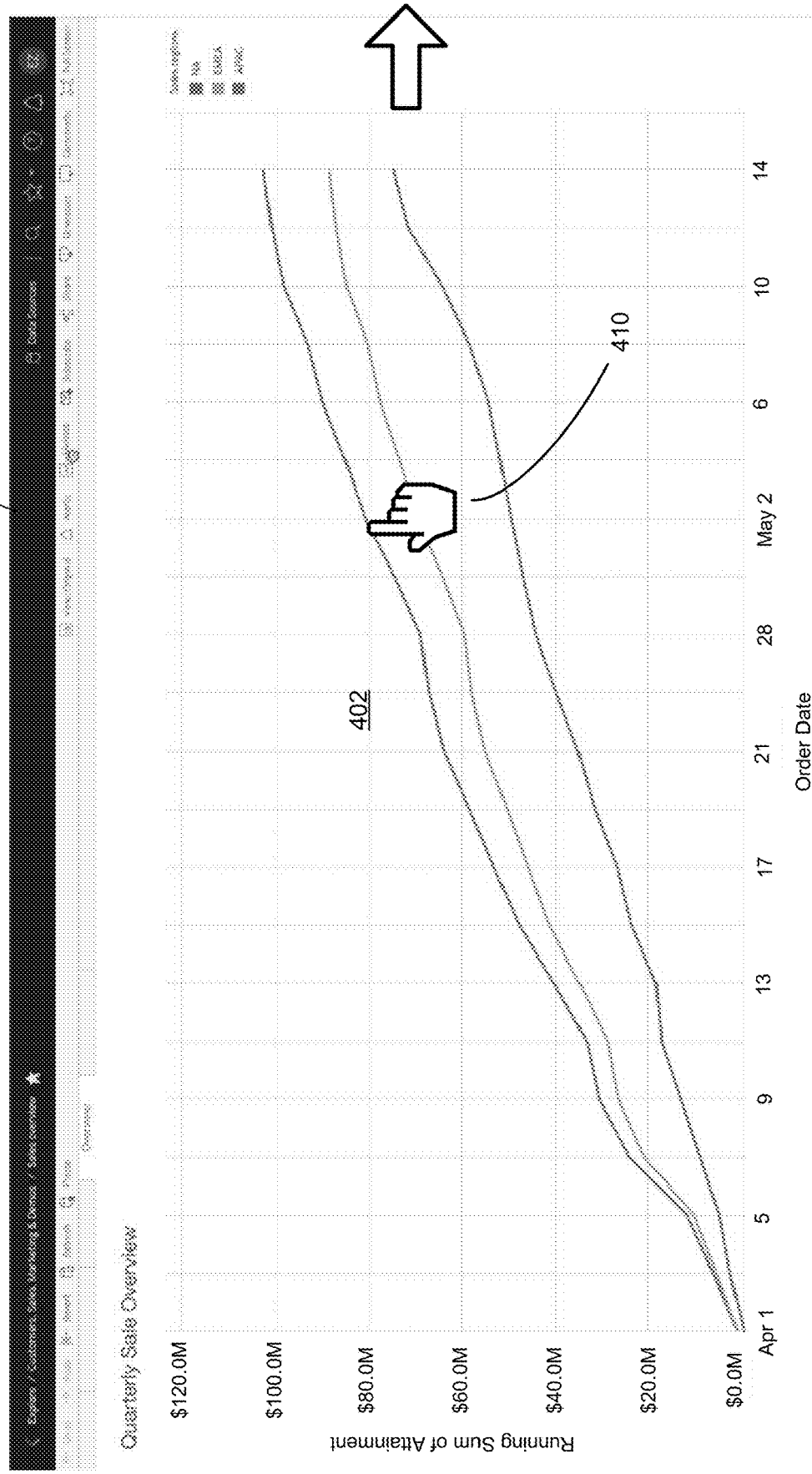
FIGS. 1A-1D illustrate a workflow that allows a user to create a data metric object through user interaction with data marks of an existing data visualization, in accordance with some implementations.
Figure 1B:
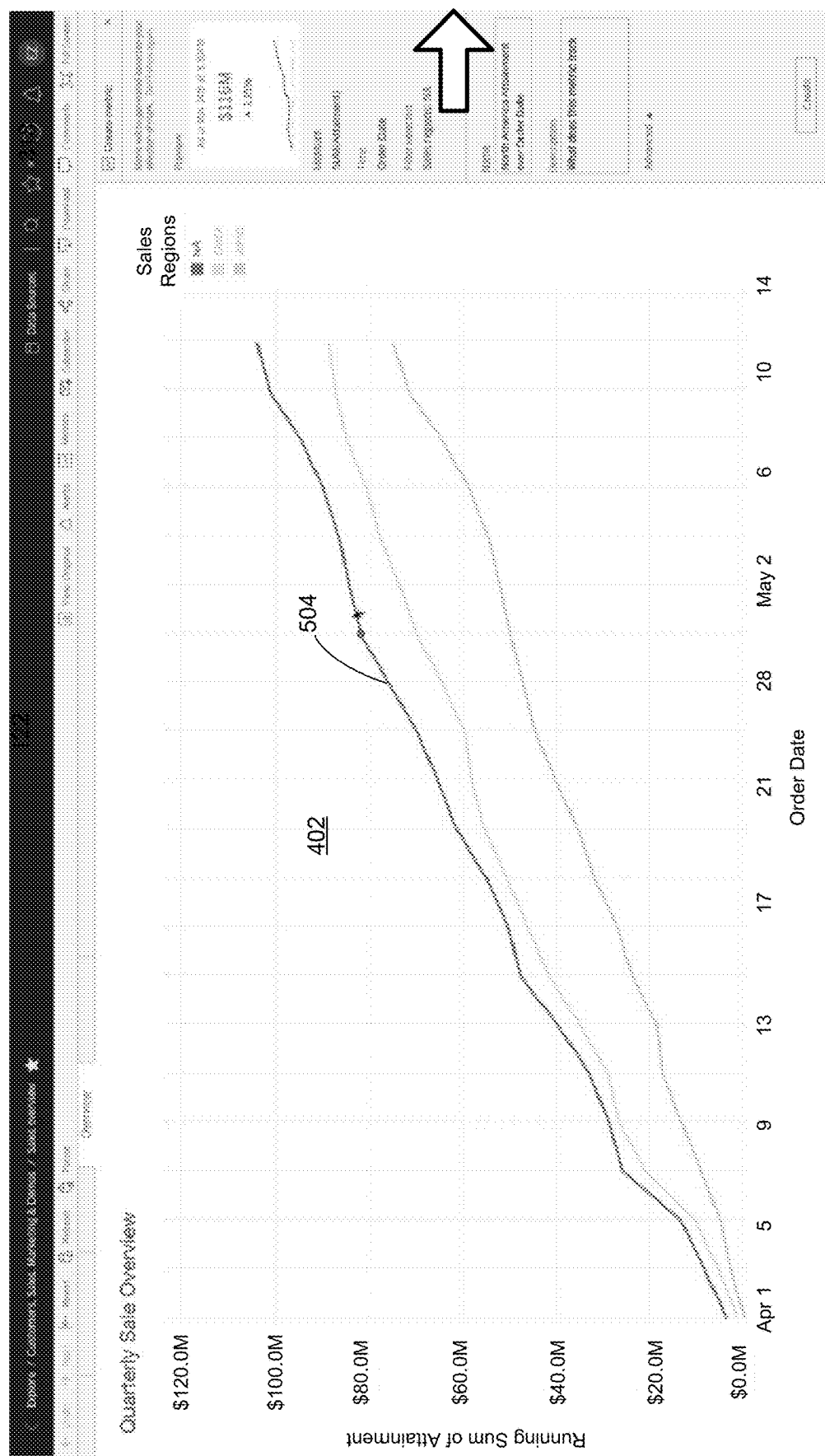
Figure 1C:
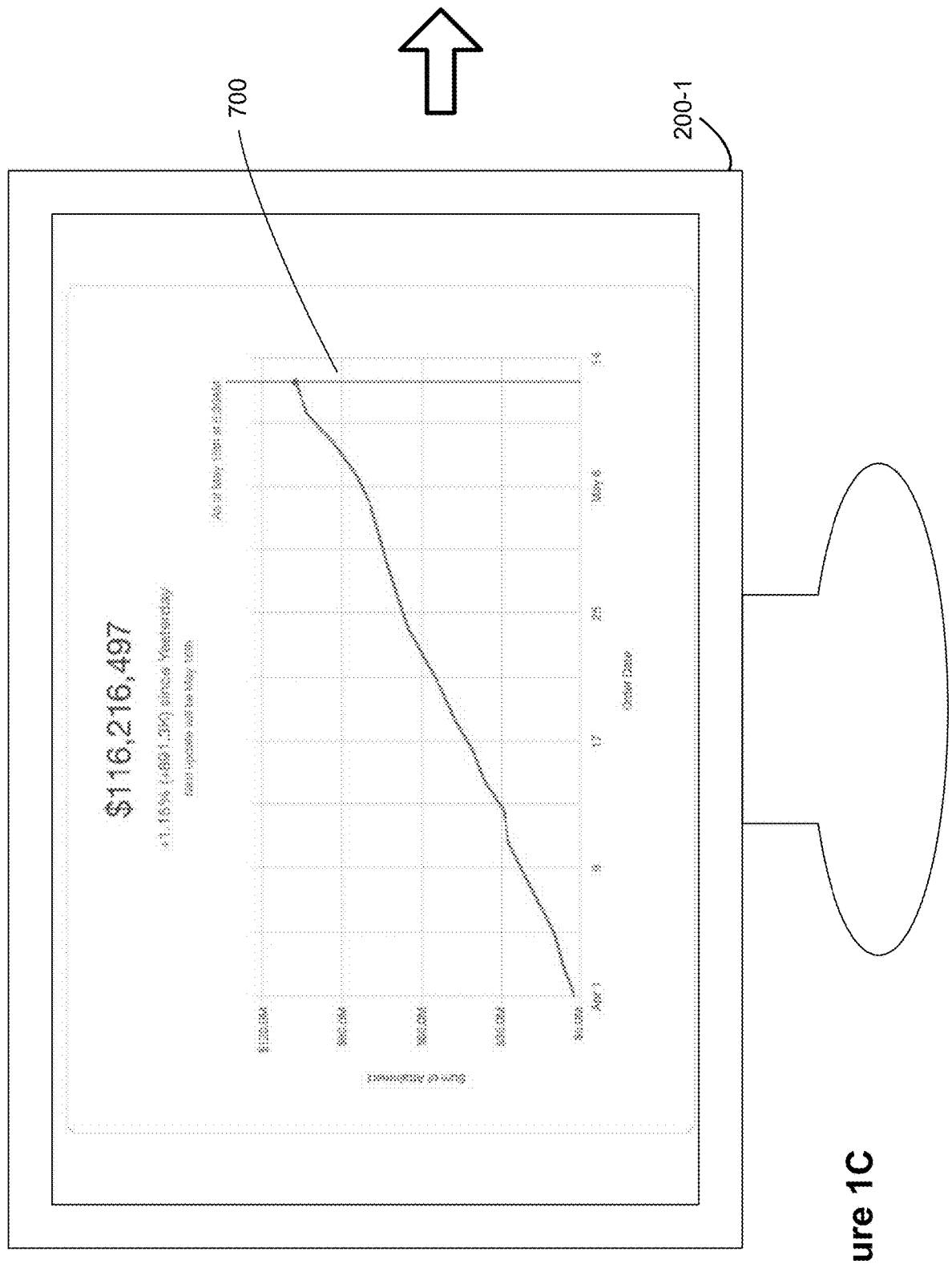
Figure 1D:
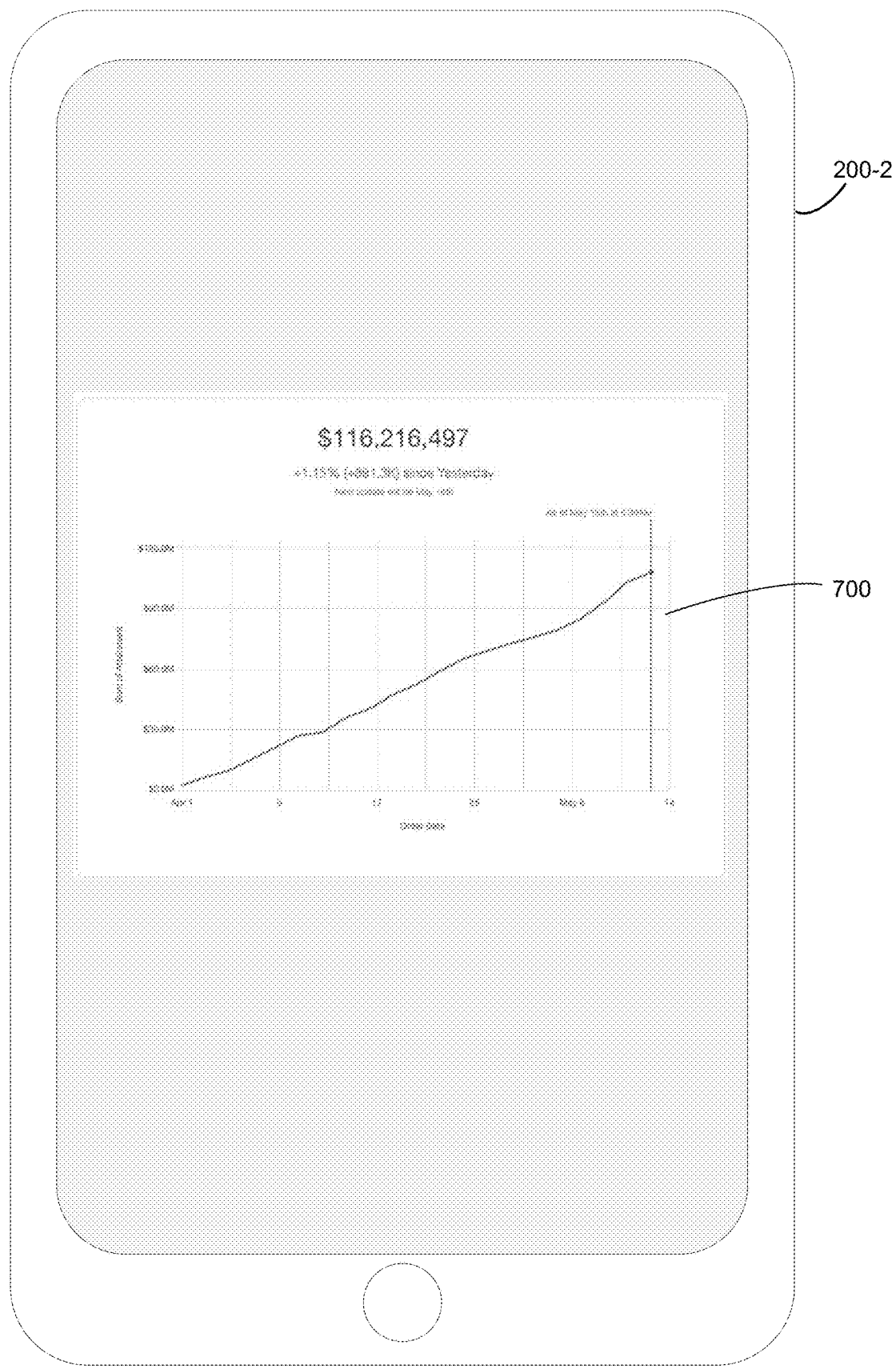
Figure 2:
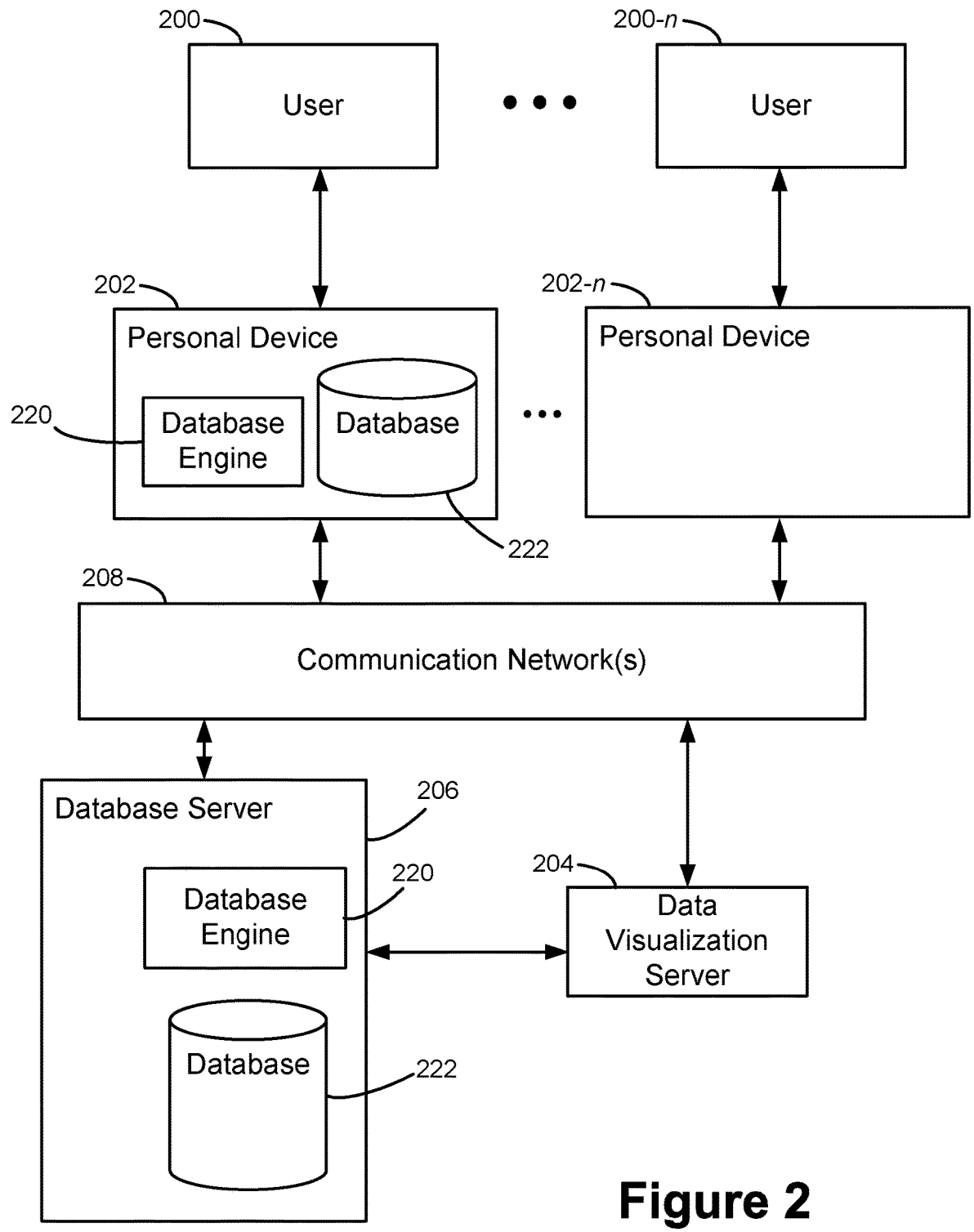
FIG. 2 is a block diagram illustrating a data visualization platform environment according to some implementations.

FIG. 2 illustrates the context in which some implementations operate. A user 200 interacts with a personal device 202, such as a desktop computer, a laptop computer, a tablet computer, a mobile computing device, or a virtual machine running on such a device. An example personal device 202 is described below with respect to FIG. 3, including various software programs or modules that execute on the device 202. In some implementations, the personal device 202 includes one or more data sources 222 and a database engine 220 that can access the data sources 222. The personal device 202 also includes a data visualization application 322 that the user 200 uses to create data visualizations from the data sources 222. That is, in some instances a user generates data visualizations using local data sources without connecting to external data sources or programs over a network.

In some cases, the personal device 202 connects over one or more communications networks 208 to external database servers 206 and/or a data visualization server 204. The communication networks 208 may include local area networks and/or wide area networks, such as the Internet. Each database server 206 has a database engine 220 and one or more databases 222. A data visualization server 204 is described in more detail with respect to FIG. 3. In some implementations, data visualization functionality is provided by both a local application 322 and certain functions provided by the server 204. For example, the server 204 may be used for resource intensive operations.

As illustrated in FIG. 2, there are generally n users with n distinct personal devices, where n is a positive integer (e.g., n=10 or n=100).

Figure 3:
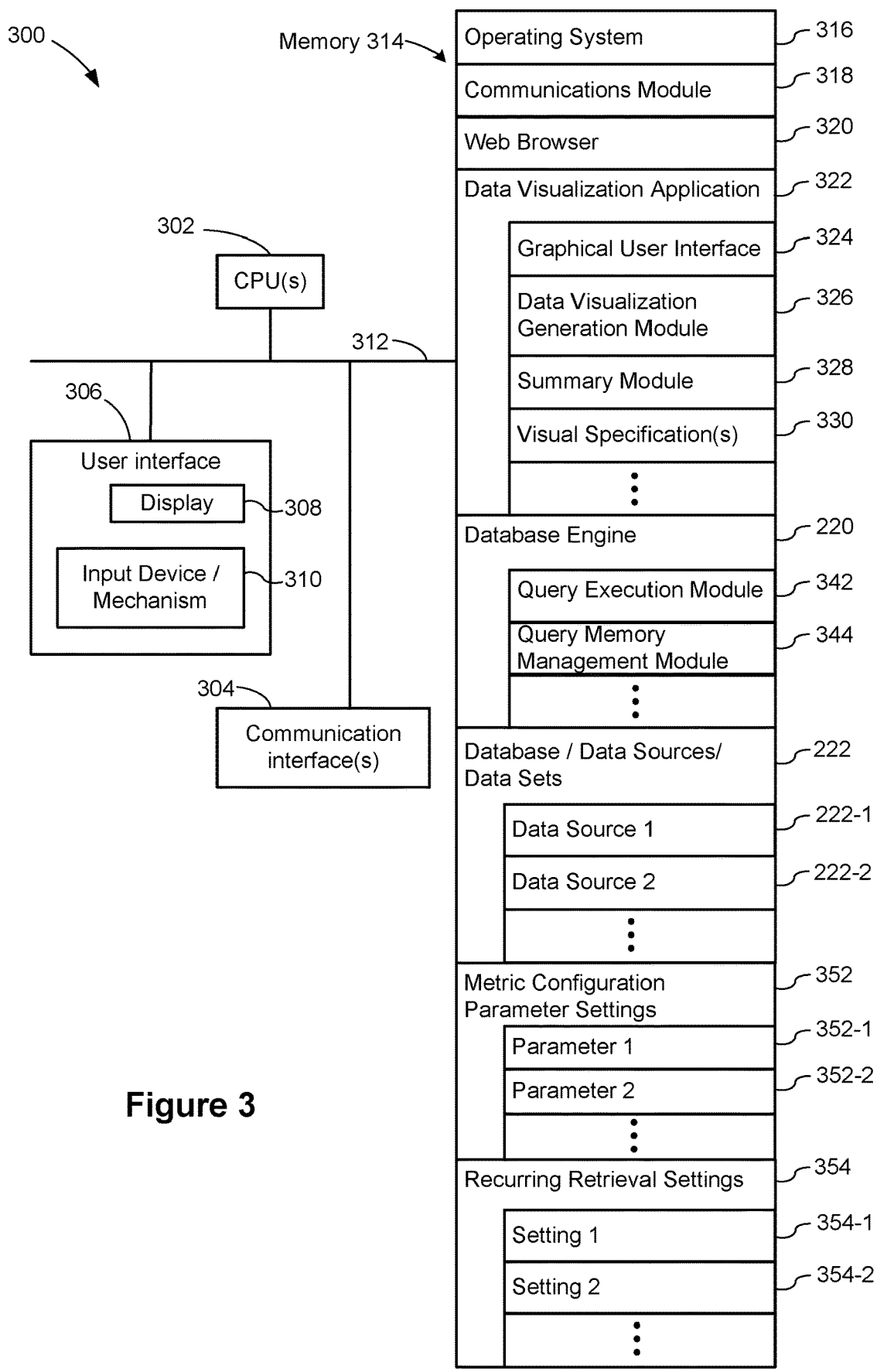
FIG. 3 is a block diagram of a computing device (e.g., a personal computing device or a server) according to some implementations.

FIG. 3 is a block diagram illustrating a computing device 300 that can display a graphical user interface 324 (e.g., for performing any of the methods described herein). Various examples of the computing device 300 include a desktop computer, a laptop computer, a tablet computer, and other computing devices that have a display and a processor capable of running a data visualization application 322. In addition, the computing device may be a server computer, a system of server computers, or a collection of computers that includes both personal computing devices 202 and server computers. The computing device 300 typically includes one or more processing units/cores (CPUs) 302 for executing modules, programs, and/or instructions stored in the memory 314 and thereby performing processing operations; one or more network or other communications interfaces 304; memory 314; and one or more communication buses 312 for interconnecting these components. The communication buses 312 may include circuitry that interconnects and controls communications between system components.

The computing device 300 includes a user interface 306, which includes a display device 308 and one or more input devices or mechanisms 310. In some implementations, the input device/mechanism includes a keyboard. In some implementations, the input device/mechanism includes a "soft" keyboard, which is displayed as needed on the display device 308, enabling a user to "press keys" that appear on the display 308. In some implementations, the display 308 and input device/mechanism 310 comprise a touch screen display (also called a touch sensitive display).

In some implementations, the memory 314 includes high-speed random access memory, such as DRAM, SRAM, DDR RAM or other random access solid state memory devices. In some implementations, the memory 314 includes non-volatile memory, such as one or more magnetic disk storage devices, optical disk storage devices, flash memory devices, or other non-volatile solid state storage devices. In some implementations, the memory 314 includes one or more storage devices remotely located from the CPU(s) 302. The memory 314, or alternatively the non-volatile memory devices within the memory 314, comprises a non-transitory computer-readable storage medium. In some implementations, the memory 314, or the computer-readable storage medium of the memory 314, stores the following programs, modules, and data structures, or a subset thereof:

- an operating system 316, which includes procedures for handling various basic system services and for performing hardware dependent tasks;
- a communications module 318, which is used for connecting the computing device 300 to other computers and devices via the one or more communication network interfaces 304 (wired or wireless) and one or more communication networks, such as the Internet, other wide area networks, local area networks, metropolitan area networks, and so on;
- a web browser 320 (or other application capable of displaying web pages), which enables a user to communicate over a network with remote computers or devices;

a data visualization application 322, which provides a graphical user interface 324 for a user to construct visual graphics. In some implementations, the information the user provides is stored as a visual specification 330. The data visualization application 322 includes a data visualization generation module 326, which takes the user input (e.g., the visual specification 330), and generates a corresponding visual graphic (also referred to as a "data visualization" or a "data viz"). The data visualization application 322 then displays the generated visual graphic in the user interface 324. In some implementations, the data visualization application 322 also includes a summary module 328, which is used for generating a summary of data fields selected by a user. In some implementations, the data visualization application 322 executes as a standalone application (e.g., a desktop application). In some implementations, the data visualization application 322 executes within the web browser 320 or another application using web pages provided by a web server (e.g., running on a data visualization server 204); and a database engine 220, which receives database queries (e.g., from a data visualization application 322) and retrieves corresponding data (e.g., from a relational database 222, such as the data sources 222-1 and 222-2). In some implementations, the database engine 220 includes a query execution module 342 and a query management module 344. In some implementations, the data sources are stored as spreadsheet files, CSV files, XML files, or flat files, or stored in a relational database;

metric configuration parameters 352, which specify how to generate a graphic corresponding to a saved metric. In some implementations, metric configuration parameters 352 include the information stored in a visual specification (e.g., visual variables corresponding to user interface shelves, which specify data fields from the data source). In some implementations, the metric configuration parameters 352 are stored in a database 222. In some implementations, the metric configuration parameters are stored in non-volatile memory on the computing device. In general, the metric configuration parameters 352 include a plurality of parameters 352-1, 352-2, . . . ; and recurring retrieval settings 354, which specify when and how a metric extract is updated. For example, the settings 354 may specify the frequency of updates, the time of day the updates occur, how much data is retained (e.g., a date range for data with timestamps, such as sales), and a level of detail at which the data is extracted (e.g., at what level the data is aggregated, if at all). In some implementations, the retrieval settings 354 specify a schedule of extraction date/time values. In some implementations, the settings are stored in a database 222 or as a file in non-volatile memory at the computing device. As noted above, there are generally multiple settings 354-1, 354-2, . . . .

Each of the above identified executable modules, applications, or sets of procedures may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, the memory 314 stores a subset of the modules and data structures identified above. Furthermore, the memory 314 may store additional modules or data structures not described above.

Although FIG. 3 shows a computing device 300, FIG. 3 is intended more as a functional description of the various features that may be present rather than as a structural schematic of the implementations described herein. In practice, and as recognized by those of ordinary skill in the art, items shown separately could be combined and some items could be separated.

Figure 4:
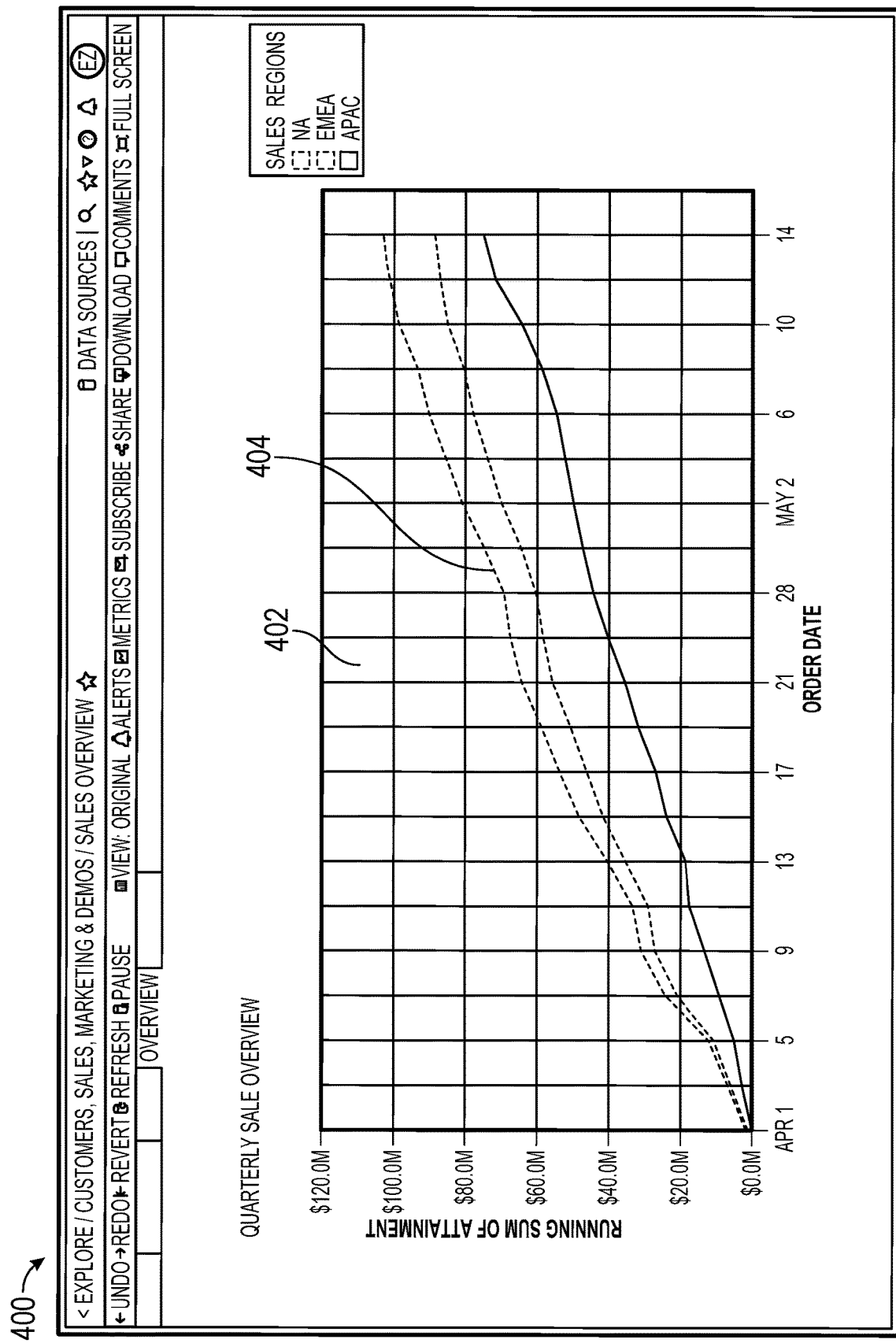
FIG. 4 illustrates a graphical user interface used in some implementations.

FIG. 4 illustrates a user interface 400 with a first data visualization 402 previously created by the user (or another author) in accordance with some implementations.

In FIG. 4, data from a selected data source is displayed in the form of a line graph 402 (e.g., generated by a data visualization generation module 326). Although a line graph is used in this example, the features described herein apply to many types of data visualizations, such as bar charts, line charts, maps, pie charts, and so on. The line graph 402 includes visual data marks (e.g., the line 404) corresponding to data points (e.g., rows) of the data source. The first data visualization 402 is interactive and allows the user to select a subset of data marks to create a data metric object.

Figure 5:
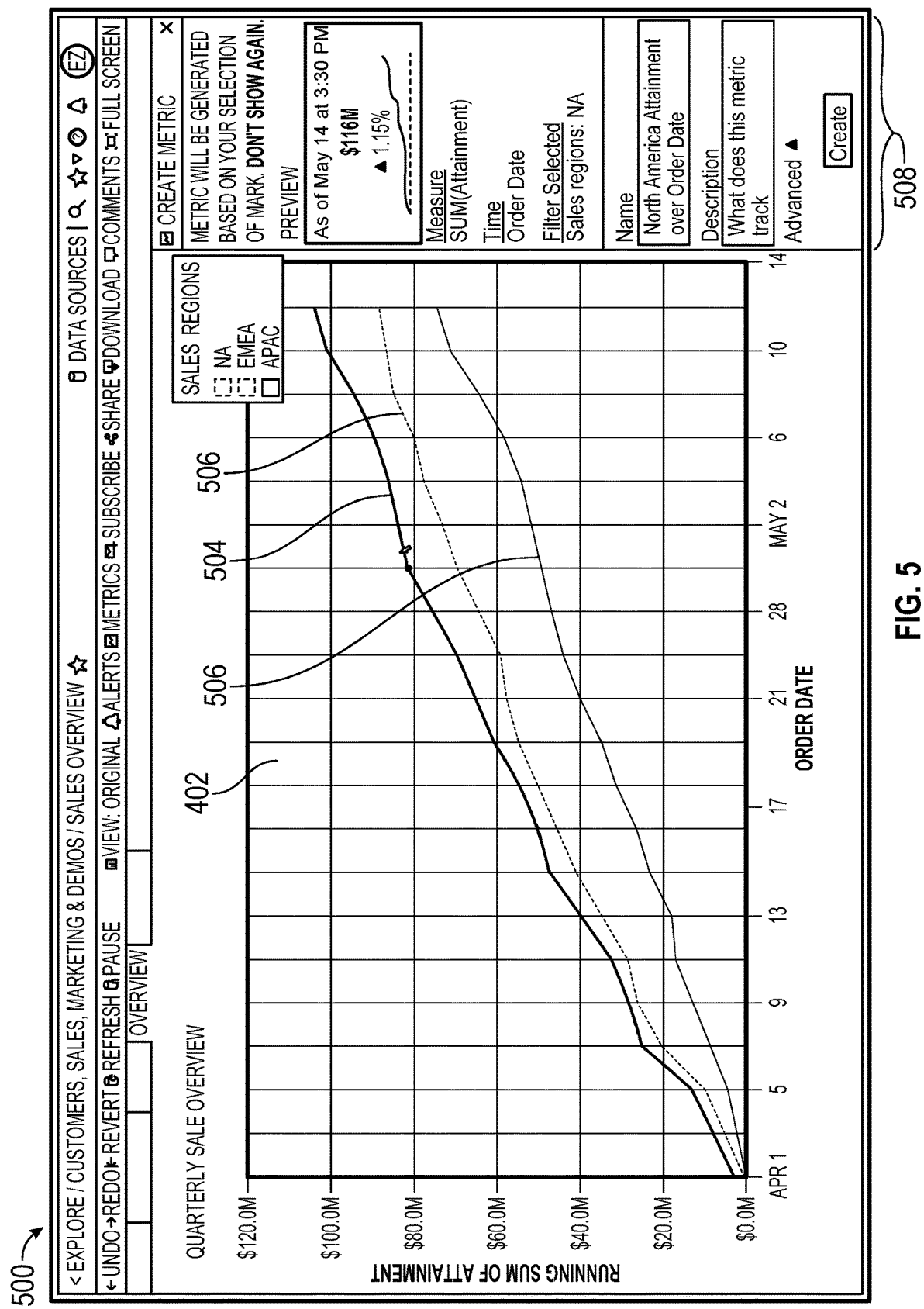
FIG. 5 illustrates a graphical user interface in which a user selects a subset of visual data marks, in accordance with some implementations.

In the example shown in FIG. 5, a user has selected the data mark 504, which is now highlighted to show the selection. The other data marks 506 are dimmed to show that they are not selected. In some implementations, the user selection fades out the unselected data marks 506. Those of ordinary skill in the art will recognize that the user selected set of data marks 504 may be emphasized in a variety of ways, to show to the user which data marks are selected.

In some implementations, when the user selects a set of data marks 504, a metric creation window 508 appears as a side pane on the right side of the user interface 500. Those of ordinary skill in the art will recognize that the metric creation window 508 can appear to the user in a variety of ways, such as a popup window or a panel in a different location within the user interface.

Figure 6A:
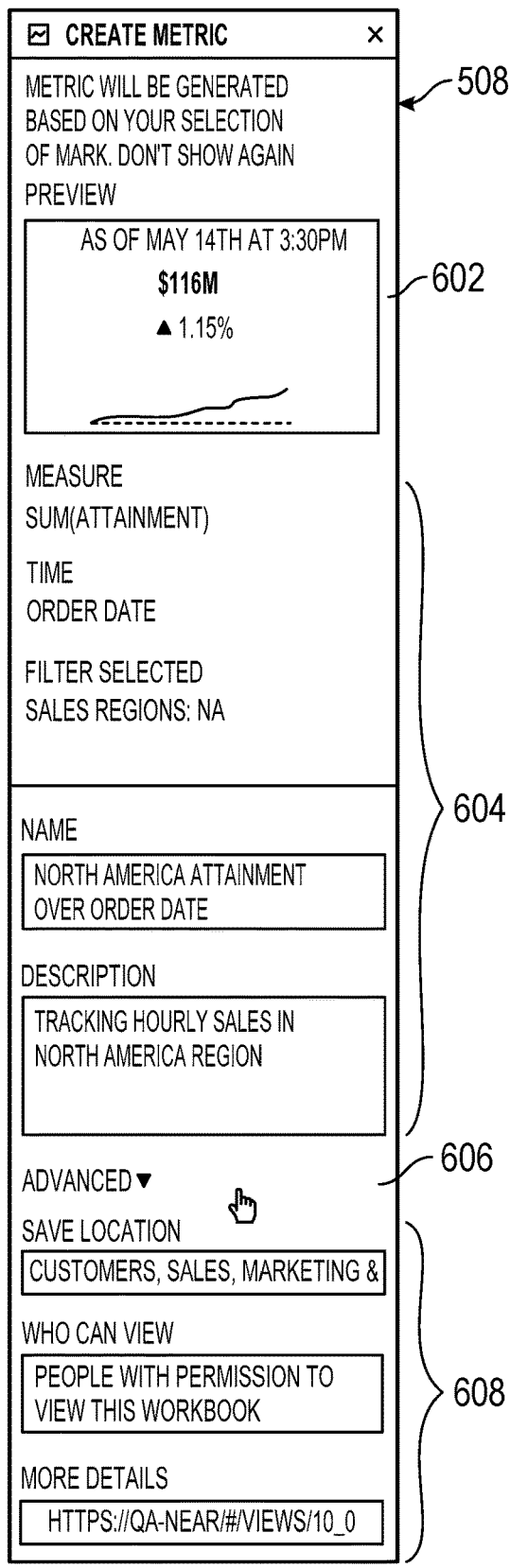
FIGS. 6A and 6B illustrate a metric creation widow used for creating data metric objects, in accordance with some implementations.
Figure 6B:
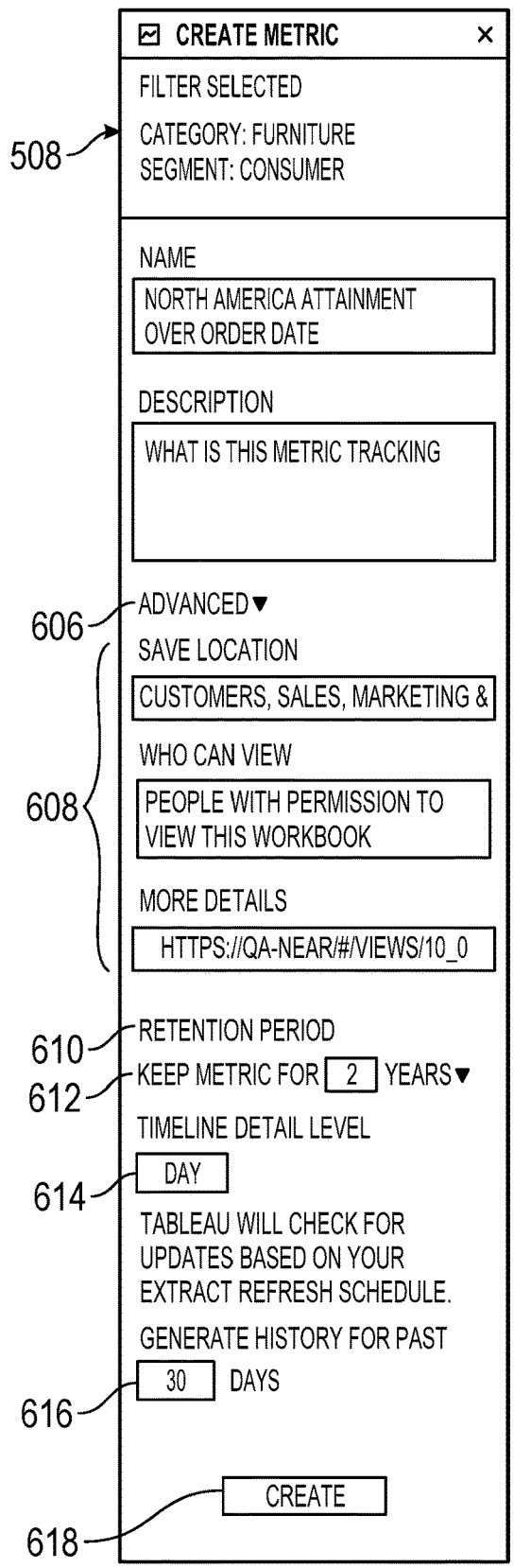

FIGS. 6A and 6B illustrate the metric creation window 508 used for creation of a data metric object. The metric creation window 508 includes a data metric object preview 602, a summary section 604 of the selected subset of visual data marks, and a setting control section 606. In some implementations, the data metric object preview 602 is a graphical representation of the (second) data visualization as shown in the graphical user interface 700 in FIG. 7.

In the example shown in FIG. 6A, the summary section 604 of the selected subset of visual data marks contains information about the user-selected data mark 504 and the first data visualization 402. In some implementations, a user can change the fields in the summary section 604.

In FIG. 6B, the setting control section 606 has been selected by the user, so the content of the metric creation window 508 has scrolled upward. The setting control section 606 includes controls for security permissions 608 and the retention period 610. The retention period controls 610 provide access to the settings for length of retention 612, timeline detail level 614 (aggregation level for the extract), and span 616 of data to be included during each extract. In this example, the span is the most recent 30 days, as measured at the time the extract occurs. The user may adjust and use the retention period controls 610 to build the data metric object. The length of retention setting 612 allows the user to determine how long each extract is retained. The timeline detail level setting 614 allows the user to determine the detail level of the data metric object visualization (e.g., the daily breakdown of data can be changed to weekly, monthly, or hourly) regardless of the settings in the first data visualization 402.

In this illustrated implementation, the user creates the data metric object by selecting the create button 618 in the metric creation window 508.

FIG. 7 illustrates a visual rendering 700 for a data metric object as created by a user. The visual rendering 700 includes a line graph 708 derived from the first data visualization 402 and user selected settings 610, information about the last refresh date 706 and the next refresh date 704 as determined by the schedule of recurring retrieval of data from the data source, and a number (or numbers) summarizing the data (the current sum of attainment). In some implementations, the visual rendering 700 changes in accordance with changes in the user selected set of data marks 504 and the user selected settings 610 (e.g., if detail level 614 is set to monthly by the user, the x-axis would show a monthly breakdown in the rendering 708).

Although the summary number 702 here represents the y-value of the graph at the current point in time, some implementations provide configuration parameters 352 that allow users to specify alternative data values or calculations for the summary number 702 (e.g., the slope of a trend line, the change of value since the previous time period, a more complex calculation, or latest mark).

Figure 8:
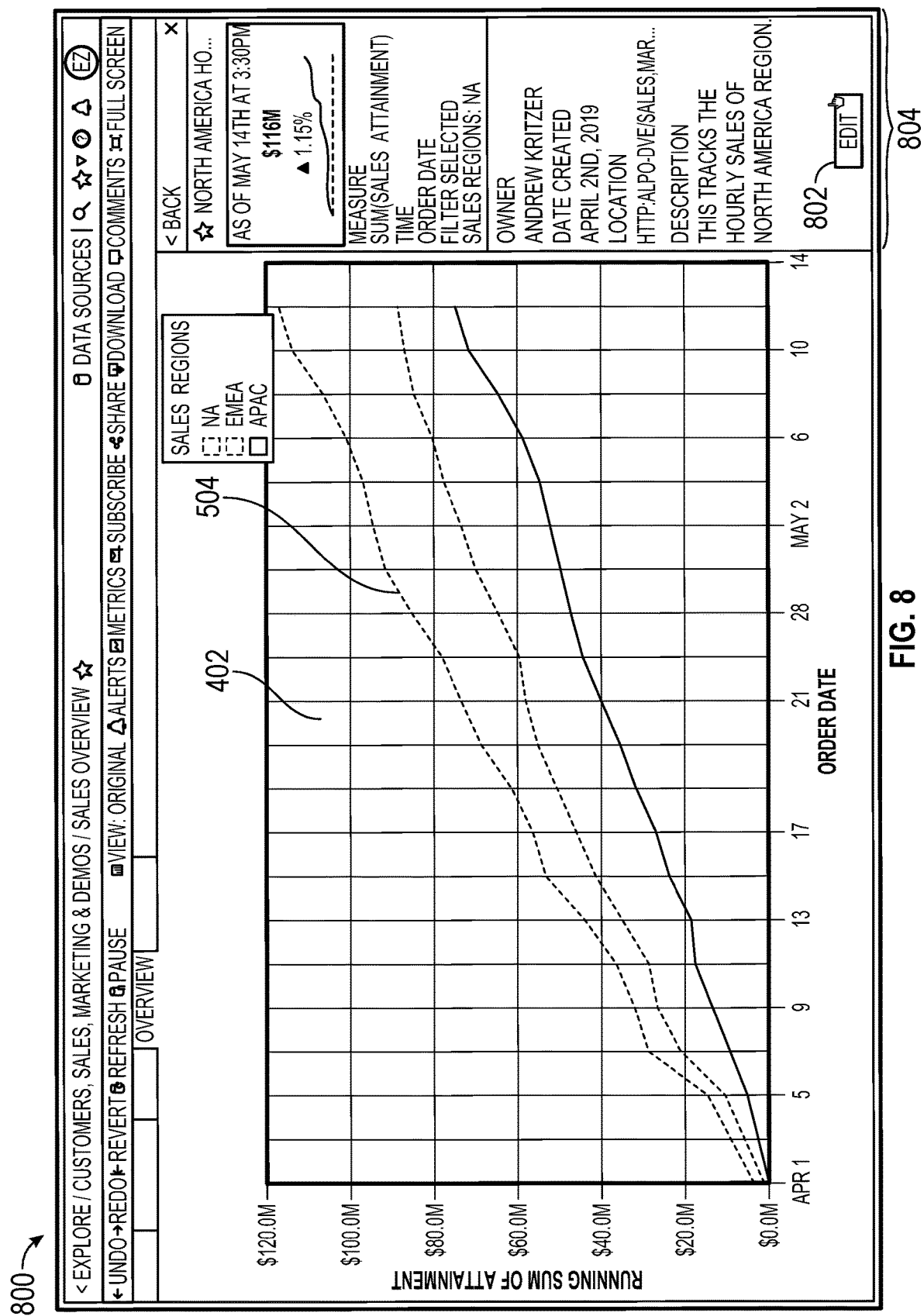
FIG. 8 illustrates a graphical user interface in which a user can edit settings of an existing data metric object, in accordance with some implementations.

FIG. 8 illustrates a graphical user interface 800 in which a user can edit settings of an existing data metric object. If a data metric object already exists for the first data visualization 402, the user can edit the data metric object in the same window. In the metric window 804 the user can click on the edit button 802 to access the metric creation window 508 as show in FIGS. 6A and 6B.

Figure 9A:
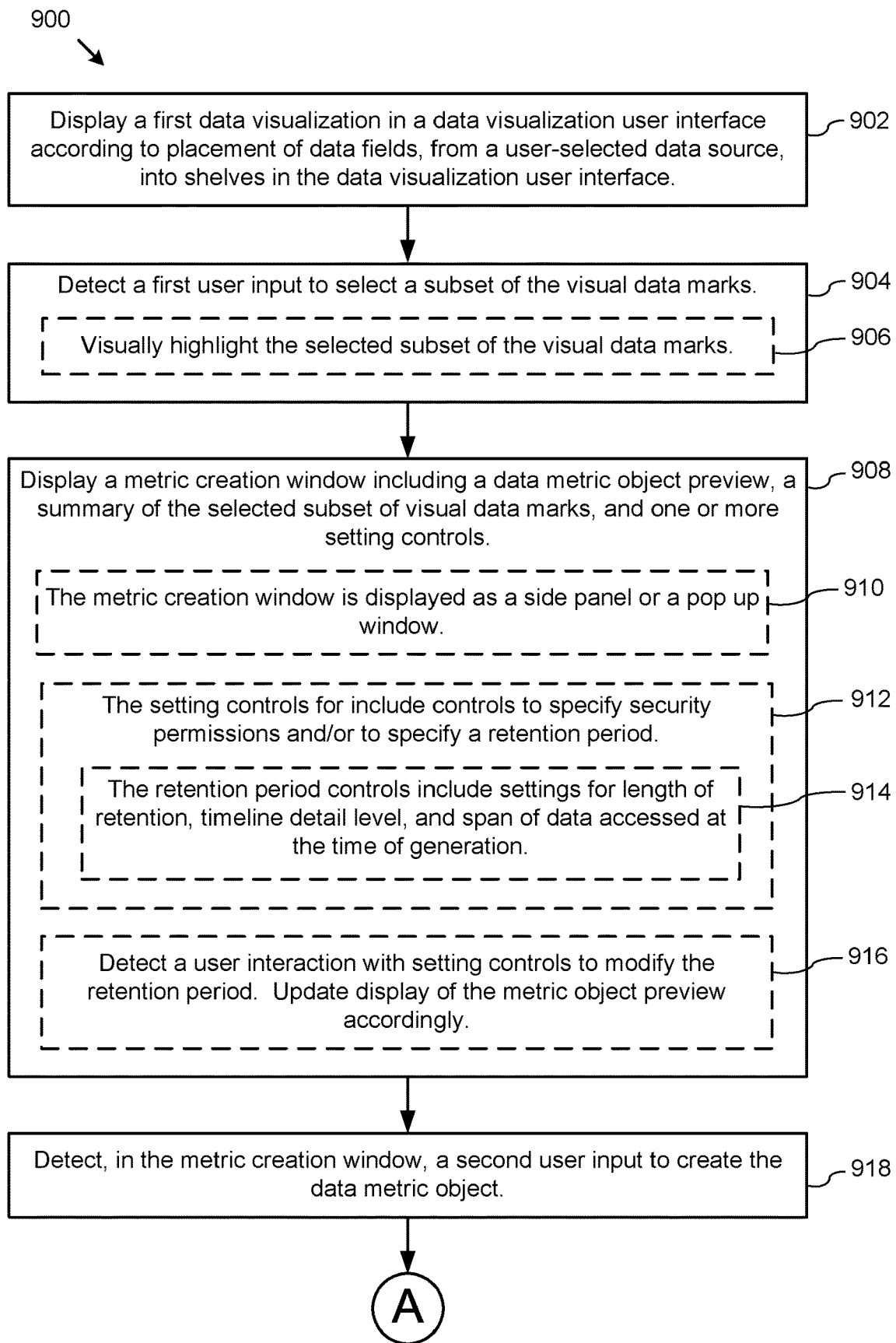
FIGS. 9A and 9B provide a flowchart of a method for generating and displaying data metric objects in accordance with some implementations.
Figure 9B:
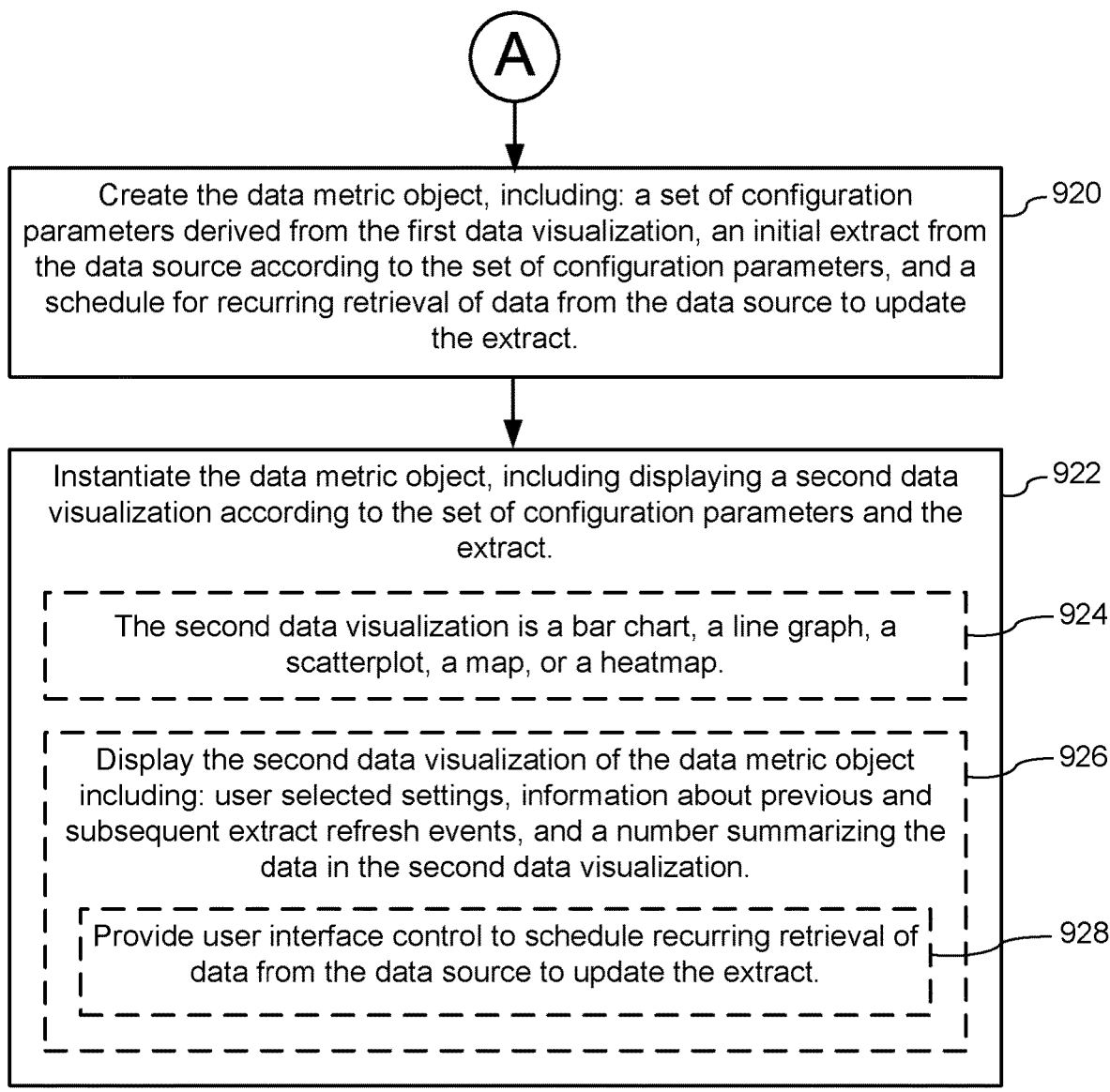

FIGS. 9A and 9B provide a flowchart for building and using data metric objects in accordance with some implementations. The method displays (902) a first data visualization in a data visualization user interface according to placement of data fields from a user-selected data source into shelves in the data visualization user interface. When a first user input to select a subset of the visual data marks is detected (904), the metric creation window is displayed (908). In some implementations, the selected set of the visual data marks is visually highlighted (906), as illustrated above in FIG. 5.

In some implementations, the metric creation window is displayed (910) as a side panel or a popup window, as illustrated above in FIG. 5. As illustrated in FIGS. 6A and 6B, some implementations include (912) setting controls to specify security permissions and/or to specify a rendition period. In some implementations, the retention period controls include (914) settings to specify (i) the length of time that extracts are retained, (ii) the level of detail for the extracts, and (iii) the span of data accessed during each extract (typically expressed as a length of time going backward from the timestamp that the extract occurs). In some instances, the user interacts (916) with the setting controls to modify the retention period. In some implementations, changing the retention period triggers generating a new extract and updating (916) the display of the metric object preview accordingly.

After the user has reviewed the settings, the user activates (918) a control (e.g., a "Create" button) to create the new metric object. The system creates (920) the data metric object, which includes the set of configuration parameters derived from the first data visualization, an initial extract from the data source according to the configuration parameters, and a schedule for recurring retrieval of data from the data sources to update the extract.

The system then instantiates (922) the data metric object, which includes displaying a second data visualization according to the set of configuration parameters and the extract. This is illustrated in FIG. 7 above. In some instances, the second data visualization is a bar chart, a line graph (as illustrated by the example in FIG. 7), a scatterplot, a map, or a heatmap. When the second data visualization is displayed, it also includes (926) user selected settings, information about previous and subsequent extract refresh events, and a number summarizing the data in the second data visualization. This is illustrated in FIGS. 7 above. As illustrated in FIGS. 8, 6A, and 6B, some implementations also provide user interface controls to schedule the recurring retrieval of data from the data source to update the extract (e.g., clicking the edit button 802 in the metric window 804, and then using one or more controls in the retention period section 610 of the metric window.

The terminology used in the description of the invention herein is for the purpose of describing particular implementations only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain the principles of the invention and its practical applications, to thereby enable others skilled in the art to best utilize the invention and various implementations with various modifications as are suited to the particular use contemplated.

What is claimed is:
1. A method of visualizing data sources, comprising:
at a computer having a display, one or more processors, and memory storing one or more programs configured for execution by the one or more processors:
receiving user selection of a data source;
displaying a first data visualization in a data visualization user interface according to placement of data fields, from the data source, in shelves of the user interface, wherein the first data visualization comprises a first plurality of visual data marks representing a first set of data from the data source;
detecting a first user input to select a subset of the visual data marks;
in response to detecting the first user input, displaying a metric creation window including a data metric object preview, a summary of the selected subset of visual data marks, and one or more setting controls;
detecting, in the metric creation window, a second user input to create the data metric object;

in response to detecting the second user input, creating the data metric object, independent of the first data visualization, including:
  a set of configuration parameters derived from the first data visualization, used to generate a second data visualization;
  an initial extract from the data source according to the set of configuration parameters; and
  a schedule for recurring retrieval of data from the data source to update the initial extract or the previously updated extract; and
in accordance with the set of configuration parameters of the data metric object, generating and displaying the second data visualization, independent of the first data visualization, the second data visualization comprising a second plurality of visual data marks representing a second set of data in the updated extract, the second set of data including data not present in the first set of data.

2. The method of claim 1, further comprising, in response to detecting the first user input, visually highlighting the selected subset of the visual data marks.

3. The method of claim 1, wherein the metric creation window is displayed as a side panel or a pop up window.

4. The method of claim 1, wherein the one or more setting controls include controls to specify security permissions and to specify a retention period.

5. The method of claim 4, wherein the controls to specify the retention period include settings for length of retention, timeline detail level, and span of data accessed at generation time.

6. The method of claim 4, further comprising:
  while displaying the metric creation window, receiving user input directed to the setting controls to modify the retention period; and
  in response to detecting user interaction with setting controls, updating display of the metric object preview.

7. The method of claim 1, wherein displaying the second data visualization is in response to detecting the second user input, and displaying the second data visualization includes displaying (i) information about current and subsequent refresh events for the initial extract or the previously updated extract and (ii) a number summarizing all data points in the second data visualization.

8. The method of claim 1, further comprising providing user interface controls to schedule recurring retrieval of data from the data source to update the initial extract or the previously updated extract.

9. The method of claim 1, wherein the second data visualization is a bar chart, a line graph, a scatterplot, a map, or a heatmap.

10. A computer system for visualizing a data sources, comprising:
  a display;
  one or more processors; and
  memory storing one or more program, wherein the one or more programs are configured for execution by the one or more processors and include instructions for:
    receiving user selection of a data source;
    displaying a first data visualization in a data visualization user interface according to placement of data fields, from the data source, in shelves of the user interface, wherein the first data visualization comprises a first plurality of visual data marks representing a first set of data from the data source;
    detecting a first user input to select a subset of the visual data marks;
    in response to detecting the first user input, displaying a metric creation window including a data metric object preview, a summary of the selected subset of visual data marks, and one or more setting controls;
    detecting, in the metric creation window, a second user input to create the data metric object;
    in response to detecting the second user input, creating the data metric object, independent of the first data visualization, including:
      a set of configuration parameters derived from the first data visualization, used to generate a second data visualization;
      an initial extract from the data source according to the set of configuration parameters; and
      a schedule for recurring retrieval of data from the data source to update the initial extract or the previously updated extract; and
    in accordance with the set of configuration parameters of the data metric object, generating and displaying the second data visualization, independent of the first data visualization, the second data visualization comprising a second plurality of visual data marks representing a second set of data in the updated extract, the second set of data including data not present in the first set of data.

11. The computer system of claim 10, wherein the one or more programs further comprise instructions for:
  in response to detecting the first user input, visually highlighting the selected subset of the visual data marks.

12. The computer system of claim 10, wherein the metric creation window is displayed as a side panel or a pop up window.

13. The computer system of claim 10, wherein one or more setting controls include controls to specify security permissions and to specify a retention period.

14. The computer system of claim 13, wherein the controls to specify the retention period include settings for length of retention, timeline detail level, and span of data accessed at generation time.

15. The computer system of claim 13, wherein the one or more programs further comprise instructions for:
  while displaying the metric creation window, receiving user input directed to the setting controls to modify the retention period; and
  in response to detecting user interaction with setting controls, updating display of the metric object preview.

16. The computer system of claim 10, wherein displaying the second data visualization is in response to detecting the second user input, and displaying the second data visualization includes displaying (i) information about current and subsequent refresh events for the initial extract or the previously updated extract and (ii) a number summarizing all data points in the second data visualization.

17. The computer system of claim 10, wherein the one or more programs further comprise instructions for:
  providing user interface controls to schedule recurring retrieval of data from the data source to update the initial extract or the previously updated extract.

18. The computer system of claim 10, wherein the second data visualization is a bar chart, a line graph, a scatterplot, a map, or a heatmap.

19. A non-transitory computer readable storage medium storing one or more programs configured for execution by one or more processors of a computer system, the one or more programs including instructions for:
  receiving user selection of a data source;
  displaying a first data visualization in a data visualization user interface according to placement of data fields, from the data source, in shelves of the user interface, wherein the first data visualization comprises a first plurality of visual data marks representing a first set of data from the data source;
  detecting a first user input to select a subset of the visual data marks;
  in response to detecting the first user input, displaying a metric creation window including a data metric object preview, a summary of the selected subset of visual data marks, and one or more setting controls;
  detecting, in the metric creation window, a second user input to create the data metric object;
  in response to detecting the second user input, creating the data metric object, independent of the first data visualization, including:
    a set of configuration parameters derived from the first data visualization, used to generate a second data visualization;
    an initial extract from the data source according to the set of configuration parameters; and
    a schedule for recurring retrieval of data from the data source to update the initial extract or the previously updated extract; and
  in accordance with the set of configuration parameters of the data metric object, generating and displaying the second data visualization, independent of the first data visualization, the second data visualization comprising a second plurality of visual data marks representing a second set of data in the updated extract, the second set of data including data not present in the first set of data.

20. The non-transitory computer readable storage medium of claim 19, wherein displaying the second data visualization is in response to detecting the second user input, and displaying the second data visualization includes displaying (i) information about current and subsequent refresh events for the initial extract or the previously updated extract and (ii) a number summarizing all data points in the second data visualization.

* * * * *